(12) United States Patent
Sasaki et al.

(10) Patent No.: US 8,994,846 B2
(45) Date of Patent: Mar. 31, 2015

(54) IMAGE PROCESSING APPARATUS AND IMAGE PROCESSING METHOD FOR DETECTING DISPLACEMENT BETWEEN IMAGES HAVING DIFFERENT IN-FOCUS POSITIONS

(71) Applicant: Canon Kabushiki Kaisha, Tokyo (JP)

(72) Inventors: Takashi Sasaki, Tokyo (JP); Naoto Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 13/760,544

(22) Filed: Feb. 6, 2013

(65) Prior Publication Data
US 2013/0222677 A1 Aug. 29, 2013

(30) Foreign Application Priority Data
Feb. 24, 2012 (JP) ................................ 2012-039131

(51) Int. Cl.
*H04N 5/228* (2006.01)
*H04N 5/232* (2006.01)

(52) U.S. Cl.
CPC ................................. *H04N 5/23212* (2013.01)
USPC ....................................................... 348/222.1

(58) Field of Classification Search
None
See application file for complete search history.

(56) References Cited

U.S. PATENT DOCUMENTS

2011/0037877 A1* 2/2011 Tamaru ......................... 348/239

FOREIGN PATENT DOCUMENTS

| JP | 2002-112095 | 4/2002 |
| JP | 2009-301181 | 12/2009 |

* cited by examiner

*Primary Examiner* — Justin P Misleh
(74) *Attorney, Agent, or Firm* — Cowan, Liebowitz & Latman, P.C.

(57) ABSTRACT

An image processing apparatus comprises an image capturing unit which captures a plurality of images having different in-focus positions; a defocus amount calculating unit which calculates a defocus amount of an image captured by the image capturing unit; a filtering unit which performs filtering on an original image according to the defocus amount calculated by the defocus amount calculating unit; and a displacement amount detecting unit which detects a displacement amount between the images having different in-focus positions using the image on which filtering was performed by the filtering unit.

18 Claims, 10 Drawing Sheets

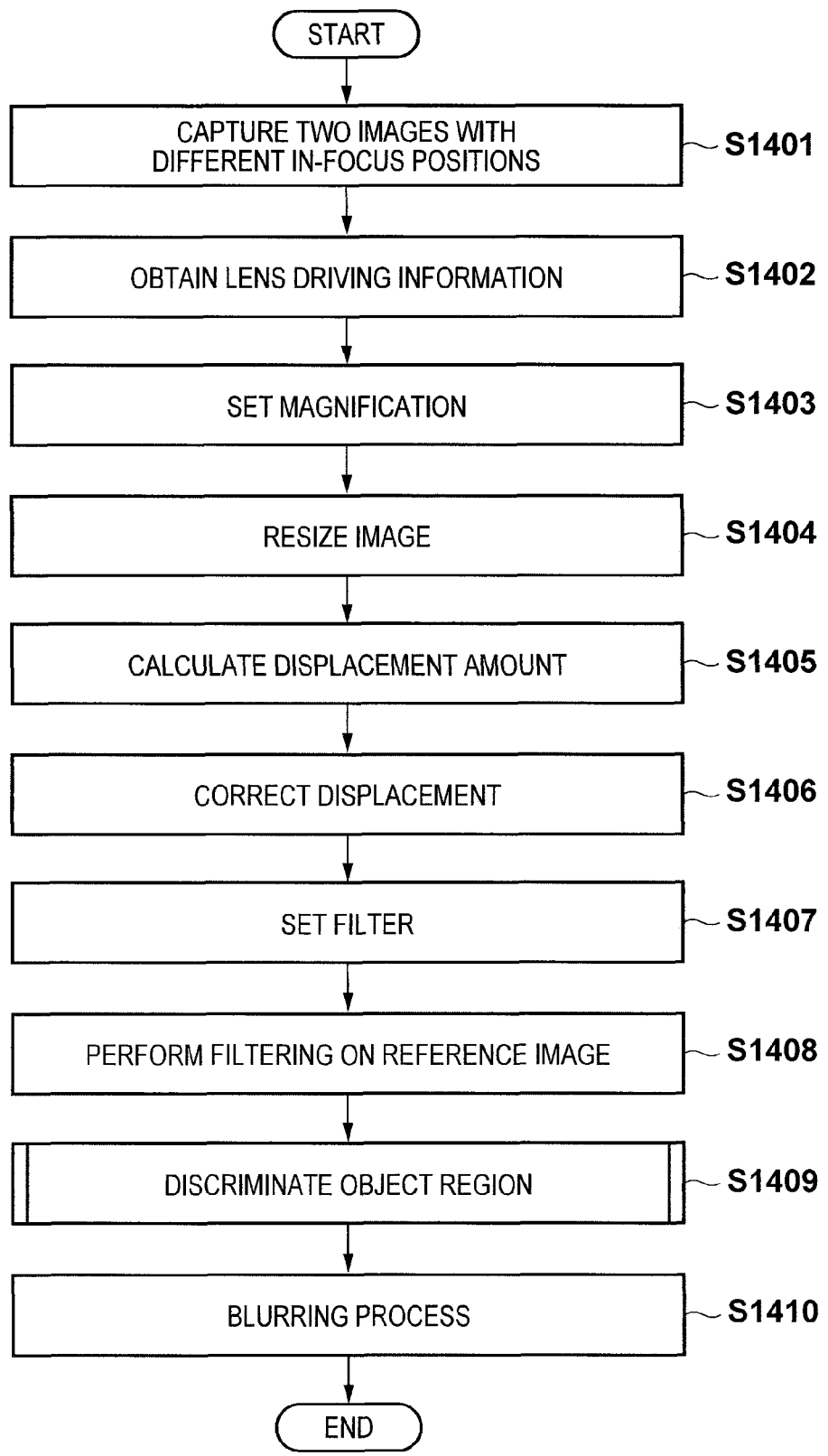

IMAGE PROCESSING APPARATUS AND IMAGE PROCESSING METHOD FOR DETECTING DISPLACEMENT BETWEEN IMAGES HAVING DIFFERENT IN-FOCUS POSITIONS

BACKGROUND OF THE INVENTION

1. Field of the Invention

The present invention relates to an image processing technique of generating an image in which defocusing of a region other than a main object is emphasized.

2. Description of the Related Art

One of the techniques of photo shooting is a method of making a depth of field shallow to narrow a focusing range, and blurring the background other than a focused object image. In order to shoot a photo with a shallow depth of field, the stop of a camera needs to be opened to make the focal length long. Generally, a photo can be shot using such technology in a single lens reflex camera in which the photographing lens has a large aperture and various combinations of the stop and the shutter speed can be selected.

In a compact-size digital still camera and a mobile telephone with a camera having an image capturing function that are recently in widespread use, a photographing lens having a small lens aperture and a very short focal length is adopted for miniaturization, and hence the depth of field is very deep. In such devices, therefore, it is difficult to shoot a photo in which the background is blurred using the above technique.

An image processing method has been proposed for generating an image in which the defocusing of the region other than the main object is emphasized more than the defocusing of the image captured by the actual driving of the stop and the lens in order to have the main object such as a person stand out more than the other objects such as the background. This method is hereinafter referred to as background blurring.

In order to realize background blurring, the process of separating the region of the main object such as the person from the region of other objects such as the background is necessary. One of such processing methods is a method for capturing two images with different in-focus positions, and separating the region of the main object and the region of other objects by increasing/decreasing the edge amount between the images.

If the image capturing is carried out with different in-focus positions when the camera is held in the photographer's hands, each captured image has relative displacement caused by hand movement and the like. Thus, in order to apply the method described above, the increase/decrease of the edge amount needs to be calculated after correcting the relative displacement and aligning the images.

However, when calculating the displacement amount for the alignment, the accuracy in the result of the displacement amount calculation may decrease since a correlation calculation is performed between the images having different defocus degrees.

As a method for realizing background blurring after aligning the images having different in-focus positions, for example, Japanese Patent Laid-Open No. 2002-112095 proposes a method for obtaining two thin-out images between the actually captured images, and calculating the displacement amount between the actually captured images using the thin-out images. Specifically, first, two consecutive shooting operations are carried out while changing the in-focus position in one shutter operation, and an actually captured image A, which is focused on the main object, an actually captured image B, which is focused on the background of the main object, and two thin-out images, which are obtained between the capturing of the actually captured image A and the actually captured image B, are retrieved. The displacement amount of the actually captured image B with respect to the actually captured image A is then calculated using the two thin-out images. The actually captured image A and the actually captured image B, in which the displacement has been corrected based on the calculated displacement amount, are composed to obtain a composite image having a desired defocus degree.

However, in Japanese Patent Laid-Open No. 2002-112095, since there is a temporal difference between the actually captured images and the thin-out images, the displacement amount calculated between the thin-out images is subjected to the influence of hand movement if hand movement occurs between the time of capturing the actually captured images and the time of capturing the thin-out images, for example. Thus, if the displacement amount between the thin-out images is assumed as the displacement amount of the actually captured images, error occurs with respect to the actual displacement amount.

Furthermore, since the displacement amount is calculated using the thin-out images having a smaller size than the actually captured images in Japanese Patent Laid-Open No. 2002-112095, the accuracy of the calculated displacement amount decreases. Specifically, if the displacement amount is calculated with the thin-out image of ⅛ of the actually captured image as in Japanese Patent Laid-Open No. 2002-112095, the displacement amount can only be detected in units of eight pixels when converted to the displacement amount in the actually captured image to be calculated eventually.

Furthermore, since Japanese Patent Laid-Open No. 2002-112095 does not describe a configuration in which the thin-out rate is varied according to the change in the defocus degree between the actually captured images, the process cannot be adaptively changed in accordance with the defocus degree between the actually captured images, and the process of enhancing the alignment accuracy cannot be performed.

SUMMARY OF THE INVENTION

The present invention has been made in consideration of the aforementioned problems, and realizes an image processing technique capable of carrying out alignment between images having different in-focus positions with high accuracy.

In order to solve the aforementioned problems, the present invention provides an image processing apparatus comprising: an image capturing unit configured to capture a plurality of images having different in-focus positions; a defocus amount calculating unit configured to calculate a defocus amount of an image captured by the image capturing unit; a filtering unit configured to perform filtering on an original image according to the defocus amount calculated by the defocus amount calculating unit; and a displacement amount detecting unit configured to detect a displacement amount between the images having different in-focus positions using the image on which filtering was performed by the filtering unit.

In order to solve the aforementioned problems, the present invention provides an image processing apparatus comprising: an image capturing unit configured to capture a plurality of images having different in-focus positions; a defocus amount calculating unit configured to calculate a defocus amount of an image captured by the image capturing unit; a magnification setting unit configured to set a magnification of an original image according to the defocus amount calculated by the defocus amount calculating unit; a resizing unit configured to change a size of the original image by the magnification set by the magnification setting unit; and a displacement amount detecting unit configured to detect a displacement amount between the images having different in-focus positions using the image whose size was changed by the resizing unit.

In order to solve the aforementioned problems, the present invention provides an image processing method for performing image processing on a predetermined region using a plurality of images having different in-focus positions, the method comprising the steps of: capturing a plurality of images having different in-focus positions; calculating a defocus amount of an image captured in the capturing step; performing filtering on an original image according to the defocus amount calculated by the defocus amount calculating step; and detecting a displacement amount between the images having different in-focus positions using the image on which filtering was performed in the filtering step.

In order to solve the aforementioned problems, the present invention provides an image processing method for performing image processing on a predetermined region using a plurality of images having different in-focus positions, the method comprising the steps of: capturing a plurality of images having different in-focus positions; calculating a defocus amount of an image captured in the capturing step; setting a magnification of an original image according to the defocus amount calculated in the defocus amount calculating step; changing a size of the original image by the magnification set in the magnification setting step; and detecting a displacement amount between the images having different in-focus positions using the image whose size was changed in the resizing step.

According to the present invention, the alignment between images having different in-focus positions can be carried out with high accuracy.

Further features of the present invention will become apparent from the following description of exemplary embodiments with reference to the attached drawings.

BRIEF DESCRIPTION OF THE DRAWINGS

FIG. 14 is a flowchart showing a blurring process according to the second embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

An example in which an image processing apparatus of the present invention is realized by an image capturing apparatus such as a single lens reflex digital camera will be described.

In a first embodiment, a process of performing background blurring using a plurality of (two) images having different in-focus positions will be described as an example of a process of carrying out alignment between images having different in-focus positions with high accuracy, which is an effect of the present invention. In order to carry out alignment between images having different in-focus positions with high accuracy, a difference in a defocus degree of a main object between the images (hereinafter referred to as defocus amount) is first calculated. Then, a filter in which the defocus amounts of the main objects between the images become equal is selected, and filtering is carried out on the image focused on the main object. That is, a process of matching the frequency band of the main object between the images is carried out. After the filtering, the displacement amount for aligning the images is calculated.

According to such process, a correlation calculation is performed between the images having the same defocus degree when calculating the displacement amount for carrying out the alignment, and hence the accuracy in the result of the displacement amount calculation improves. Furthermore, the process can be adaptively changed by appropriately selecting the filter according to the defocus amount between the images having different in-focus positions. As a result, the alignment accuracy is enhanced.

Device Configuration

A configuration of an image capturing apparatus according to this embodiment of the present invention will be described with reference to FIG. 1.

Figure 1:
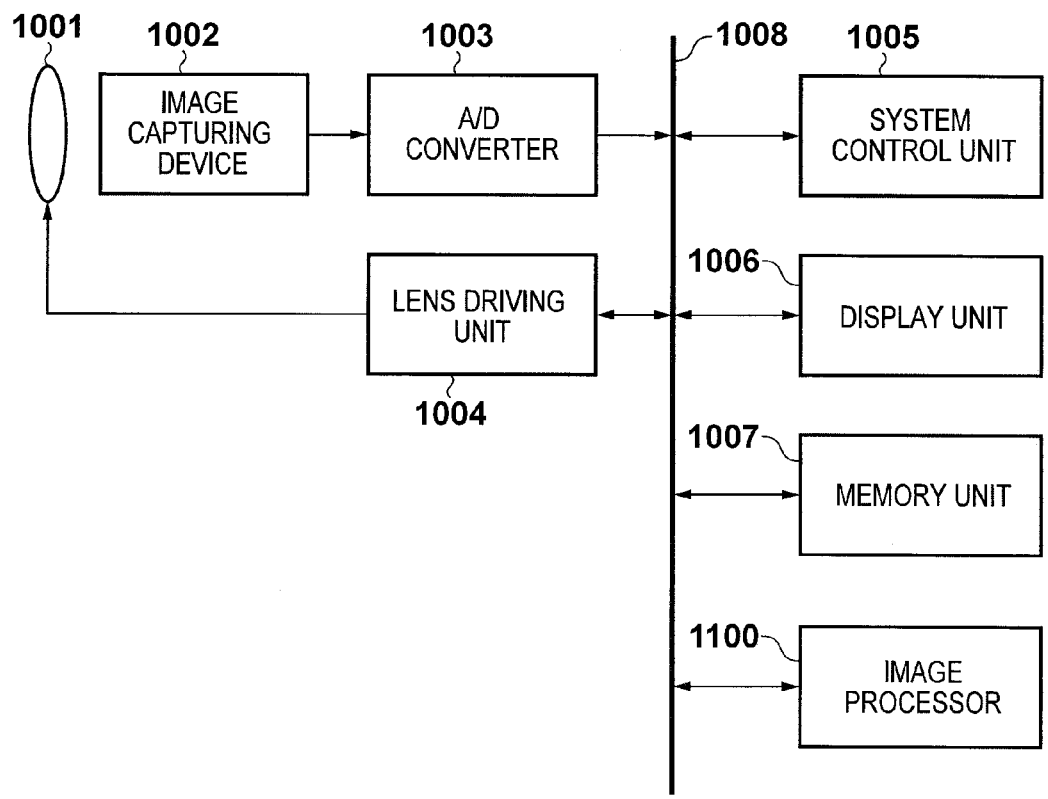
FIG. 1 is a block diagram illustrating a configuration of an image processing apparatus of the present embodiment.

In FIG. 1, a photographing lens 1001 forms an object image optically on an image capturing device 1002. The image capturing device 1002 is a photo-electric conversion element configuring a CCD, a CMOS image sensor, or the like, and converts the object image that passed through the photographing lens 1001 to an electric signal to generate an image signal. An A/D (Analog/Digital) converter 1003 converts the analog image signal output from the image capturing device 1002 to digital image data.

A lens driving unit 1004 is controlled by a system control unit 1005, to be described later, to drive the photographing lens 1001 in an optical axis direction and change the in-focus position. The lens driving unit 1004 can also output driving information of the photographing lens 1001.

The system control unit 1005 has a function of comprehensively controlling the entire apparatus, and includes a CPU, a ROM, a RAM, an interface circuit, and the like.

A display unit 1006 is configured by a liquid crystal display (LCD) or an organic EL (Electro Luminescence) display, and displays image data generated by the image capturing device 1002 and image data read out from a memory unit 1007. The memory unit 1007 has a function of recording the image data, and for example, may include an information recording medium that uses a memory card on which a semiconductor memory is mounted, a package accommodating a magnet-optical disk, or the like. The information recording medium may be detachably provided with respect to the image capturing apparatus.

A bus 1008 is used as a transmission path when exchanging information among the A/D converter 1003, the lens driving unit 1004, the system control unit 1005, the display unit 1006, the memory unit 1007, and an image processor 1100.

In addition to general image processing, the image processor 1100 extracts an object region based on a plurality of image signals having different in-focus positions and the lens driving information, and carries out a blurring process on a predetermined region other than a main object region.

Configuration of Image Processor

The configuration and function of the image processor 1100 of the present embodiment will now be described with reference to FIG. 2 to FIG. 4.

Figure 2:
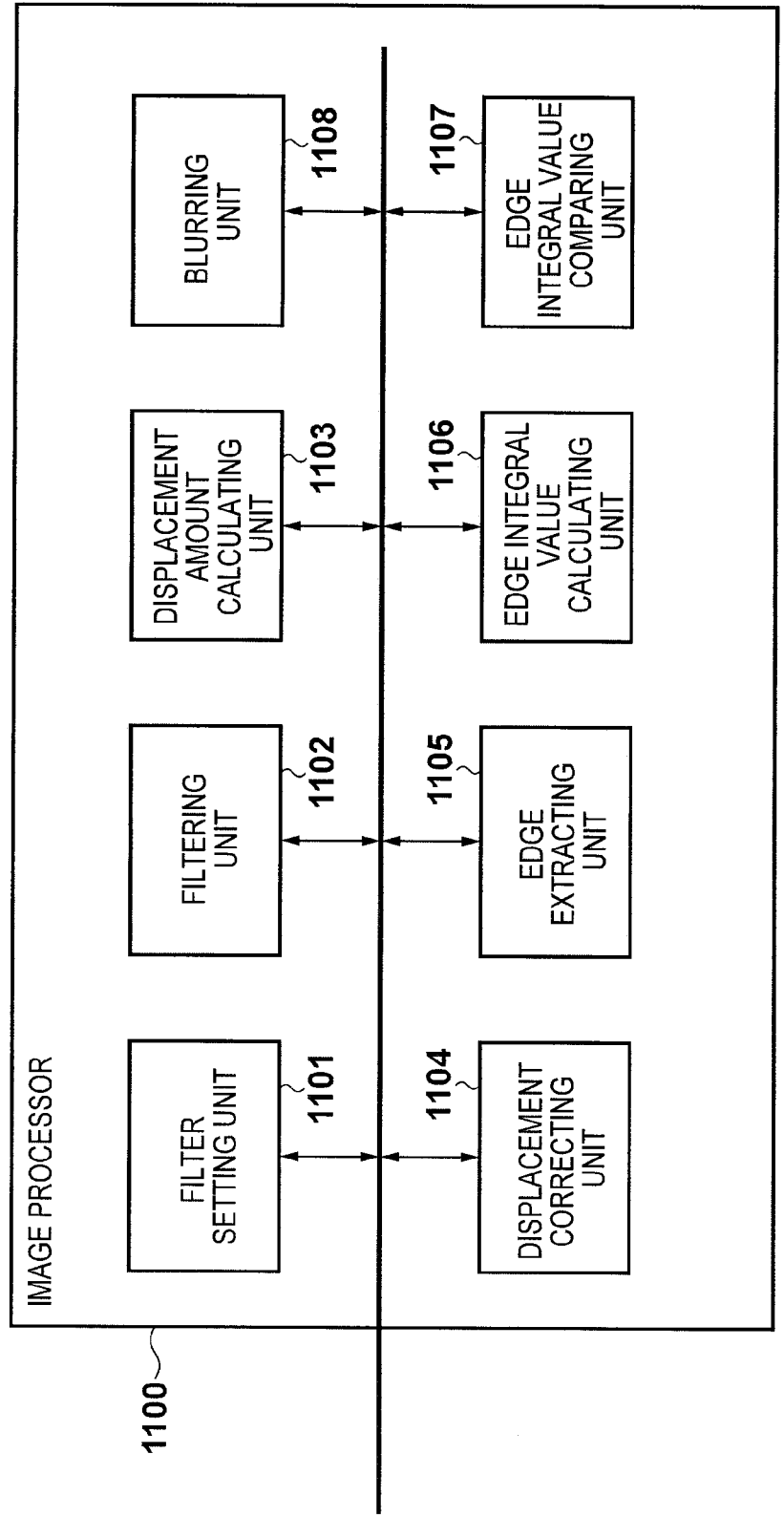
FIG. 2 is a block diagram illustrating a configuration of an image processor of the present embodiment.

As shown in FIG. 2, the image processor 1100 includes a filter setting unit 1101, a filtering unit 1102, a displacement amount calculating unit 1103, a displacement correcting unit 1104, an edge extracting unit 1105, an edge integral value calculating unit 1106, an edge integral value comparing unit 1107, and a blurring unit 1108.

Blurring Process

The blurring process performed by the image processor 1100 of the present embodiment will be described below with reference to FIG. 3. The process of FIG. 3 is realized by causing the system control unit 1005 to develop a program stored in the ROM in a work area of a volatile memory such as the RAM and execute the program.

Figure 3:
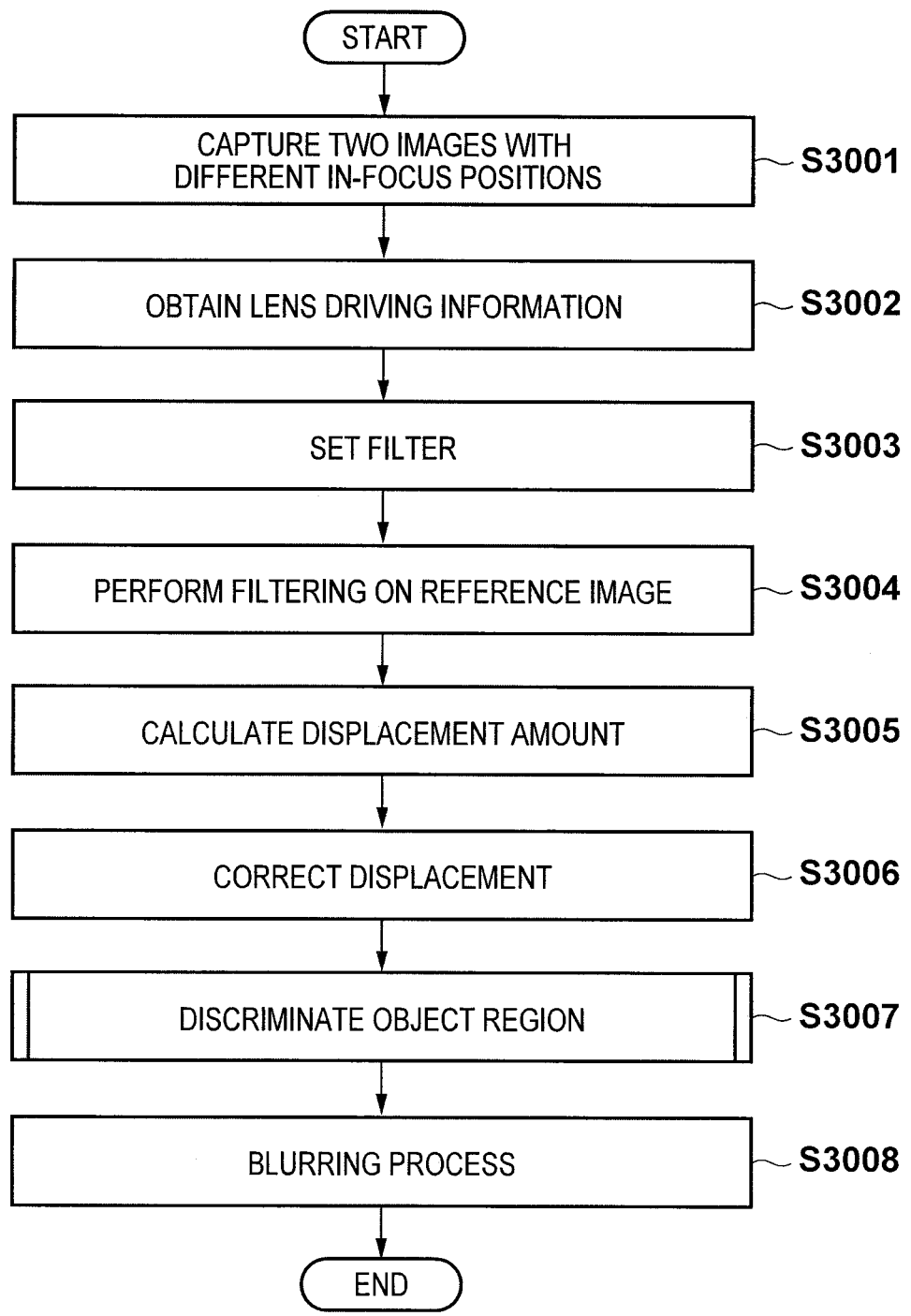
FIG. 3 is a flowchart showing a blurring process according to a first embodiment.

According to FIG. 3, in step S3001, the system control unit 1005 controls the lens driving unit 1004 to drive the photographing lens 1001, and drives the image capturing device 1002 to consecutively capture two images having different in-focus positions. The images are assumed to be images captured through consecutive shooting in a hand-held state. The image to capture is not limited to the image captured in the hand-held state, and may be obtained from an intended motion (panning or zooming) of the photographer or a configuration that gives a mechanical motion to the optical apparatus or the image capturing device of the camera.

Figure 5A:
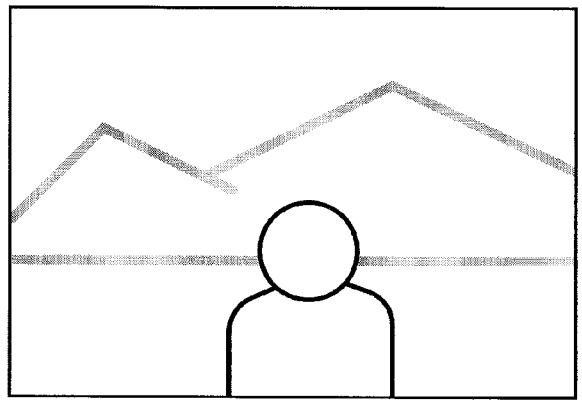
FIGS. 5A and 5B are views illustrating two images captured with different in-focus positions in the first embodiment.
Figure 5B:
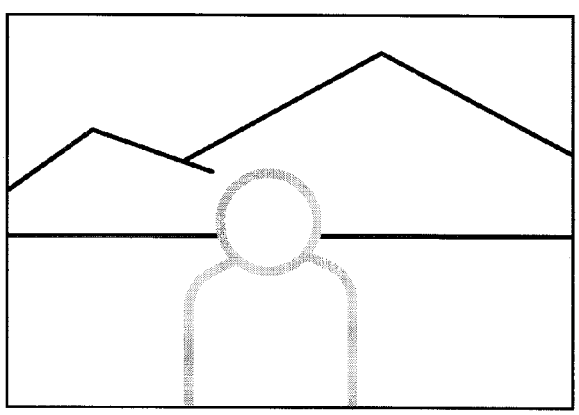

First of all, the photographing lens 1001 is moved to a first lens position where focus is on a person, who is the main object, to capture an image. The image captured at this time is shown in FIG. 5A. Since the focus is on the main object, the background other than the main object is defocused. The main object is not limited to a person, and may be animals such as dogs, cats, and birds, or machines such as cars, trains, and airplanes, for example. The photographing lens 1001 is then driven from the first lens position by $\Delta x$ to a second lens position where focus is on the background to capture an image. The image captured at this time is shown in FIG. 5B. Since the focus is on the background, the main object is defocused. Furthermore, displacement occurs due to hand movement.

The image capturing order is not limited to the above, and the image focused on the background may be captured first.

In the present embodiment, block matching is used as a method for calculating the displacement amount between the images, to be described later. Therefore, the lens driving amount $\Delta x$ is limited to a range in which the defocus amount when the in-focus position is changed can be detected by block matching.

Furthermore, two images are captured with different in-focus positions, but the number of images merely needs to be at least two or more, and a plurality of images may be used.

In step S3002, the system control unit 1005 obtains the lens driving amount $\Delta x$ from the first lens position where the focus is on the main object, to the second lens position where the focus is on the background as lens driving information when the images having different in-focus positions are captured in step S3001.

In step S3003, the system control unit 1005 calculates the defocus amount of the main object between the first image (FIG. 5A) focused on the main object and the second image (FIG. 5B) focused on the background using the lens driving amount $\Delta x$ obtained in step S3002 in the filter setting unit 1101. A filter for matching the frequency bands of the main object is set according to the calculated defocus amount of the main object.

Through such process, the correlation calculation of the displacement amount calculation is carried out after performing the process of matching the frequency bands of the object even between the images having different in-focus positions, so that a highly accurate calculation result can be obtained.

Defocus Amount Calculating Method

A defocus amount calculating method of the present embodiment will be described below.

Figures 6A, 6B:
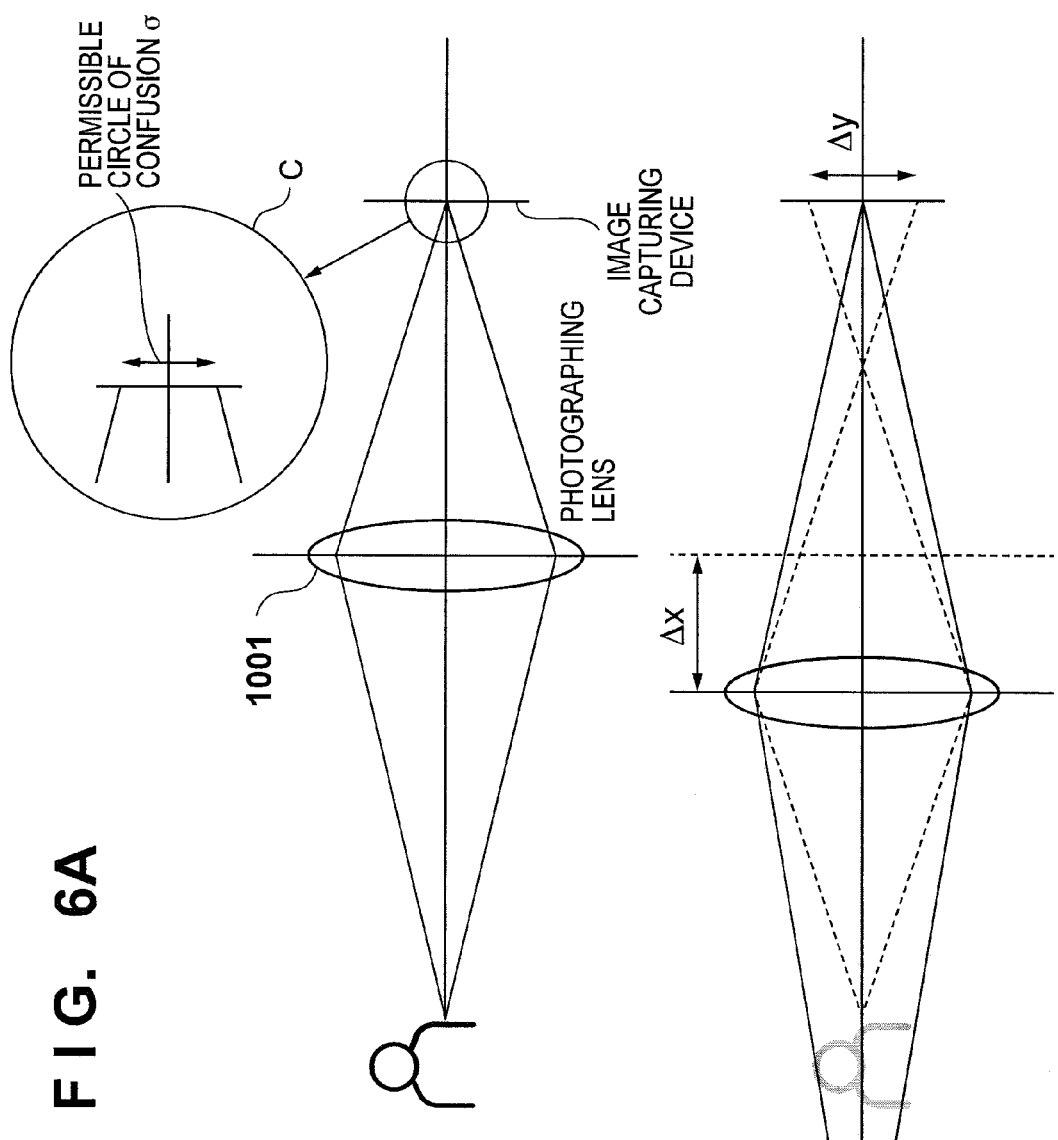
FIGS. 6A and 6B are schematic views describing a state in which focus is on a main object and a state in which focus is on the background, respectively, in the first embodiment.

FIG. 6A shows a state in which focus is on the main object, and FIG. 6B shows a state in which focus is on the background. In FIG. 6A, the object image that passed through the photographing lens from the main object is formed on the surface of the image capturing device, and the main object is clearly shot. In FIG. 6B, on the other hand, the photographing lens is driven by the lens driving amount $\Delta x$ in the optical axis direction from FIG. 6A to focus on the background. That is, the object image that passed through the photographing lens from the background is formed on the surface of the image capturing device, and the background is clearly shot. The object image from the main object in this state is formed short of the surface of the image capturing device on the optical axis, and is formed in a manner spread by $\Delta y$ on the surface of the image capturing device. Thus, the main object is shot in a defocused manner. The $\Delta y$ becomes the defocus amount of the main object. The defocus amount $\Delta y$ can be calculated by storing the defocus amount $\Delta y$ with respect to the lens driving amount $\Delta x$ in advance.

Since spherical aberration and astigmatism exist in the photographing lens 1001 as indicated in an enlarged portion C of FIG. 6A, the photographing lens 1001 cannot, in a precise sense, form a point as a point. In other words, the photographing lens 1001 shapes an image as a collection of circles having a certain area. The diameter of a circle that can be tolerated as a point image even if a point image, which is an object, is blurred thus forming a circular image on the surface of the image capturing device is referred to as permissible circle of confusion $\sigma$.

Figure 7:
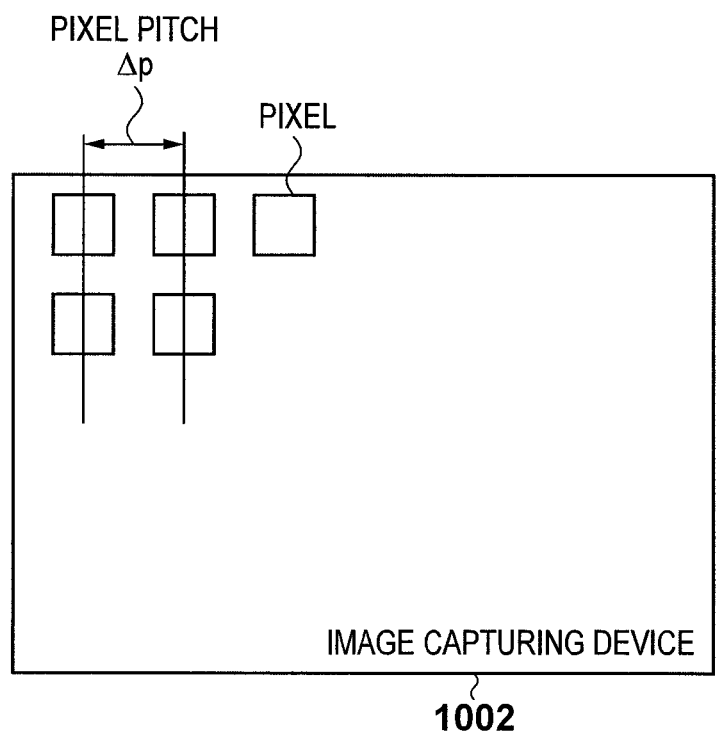
FIG. 7 is a schematic view describing a pixel pitch in an image capturing device of the first embodiment.

The permissible circle of confusion $\sigma$ is equal to a pixel pitch $\Delta p$ in the image capturing device shown in FIG. 7, and has the following relationship.

$$\sigma = \Delta p \quad (1)$$

According to Equation 1, if x pixels represent the main object before driving the lens and the defocus amount is Δy, for example, xΔy pixels represent the main object after driving the lens.

Filter Setting

The filter setting process performed by the filter setting unit 1101 of the image processor 1100 of the present embodiment will now be described. The setting of the filter for matching the frequency bands of the main object will be described below.

In the present embodiment, filtering is performed on the first image (FIG. 5A) focused on the main object so that the defocus amount of the main object between the images having different in-focus positions becomes equal, whereby the frequency band becomes the same as that of the main object in the second image (FIG. 5B) focused on the background. The approximate position in the image of the main object may be a position in the image focused at the time of shooting or may be determined by assuming the object is near the center of the screen.

Figure 8:
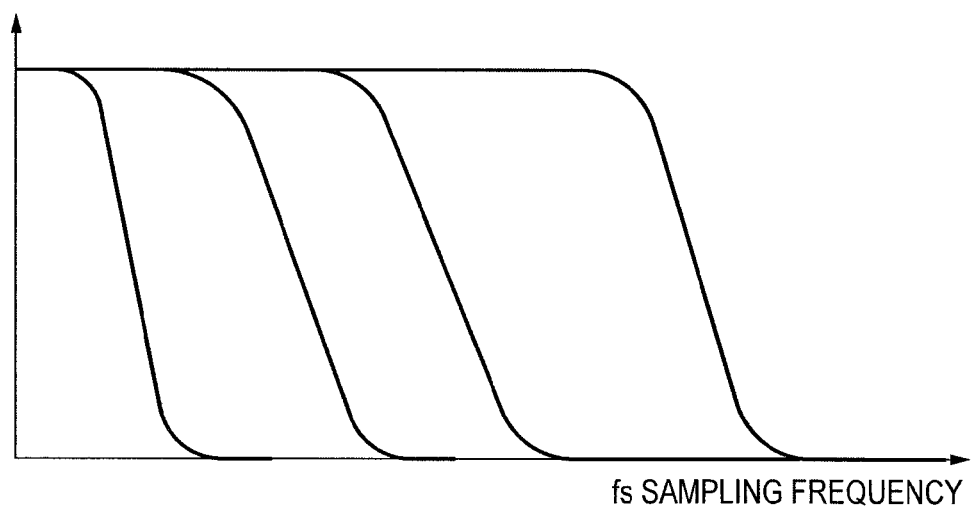
FIG. 8 is a schematic view illustrating the frequency characteristics of a filter.

To set the filter to use according to the magnitude of the defocus amount, a plurality of filters having different frequency characteristics are prepared as shown in FIG. 8, and associated with lens driving amounts Δx in advance. After obtaining the lens driving amount Δx in step S3002, the filter corresponding to the lens driving amount Δx is set. The filter may be appropriately generated according to the magnitude of the defocus amount.

Figure 9:
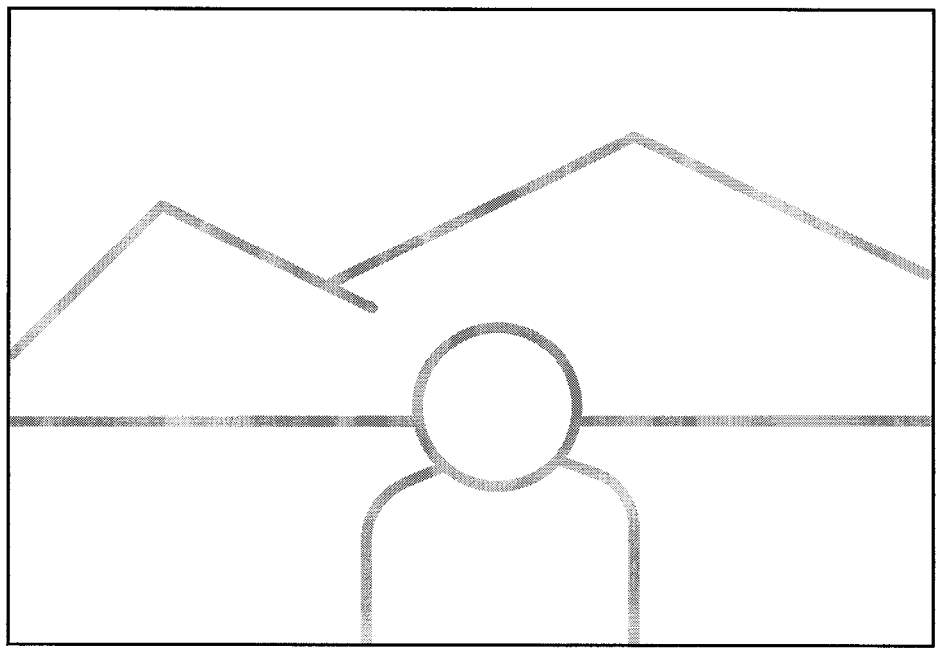
FIG. 9 is a view illustrating an image in which filtering was performed on an image focused on the main object.

In step S3004, the filter set in step S3003 is applied to the first image (FIG. 5A) focused on the main object in the filtering unit 1102. The result is as shown in FIG. 9, and the defocus amount of the main object is equal to the defocus amount of the main object in the second image (FIG. 5B) focused on the background.

In step S3005, the displacement amount of the two images is calculated so that the positions of the main objects are aligned in the displacement amount calculating unit 1103. The images that serve as the target for displacement amount calculation are the result (FIG. 9) obtained in step S3004 and the image (FIG. 5B) focused on the background. In the calculation of the displacement amount, the displacement amount is calculated with FIG. 9 as the reference image and FIG. 5B as the comparative image.

The following block matching, for example, is used as the method for calculating the displacement amount.

Figure 10:
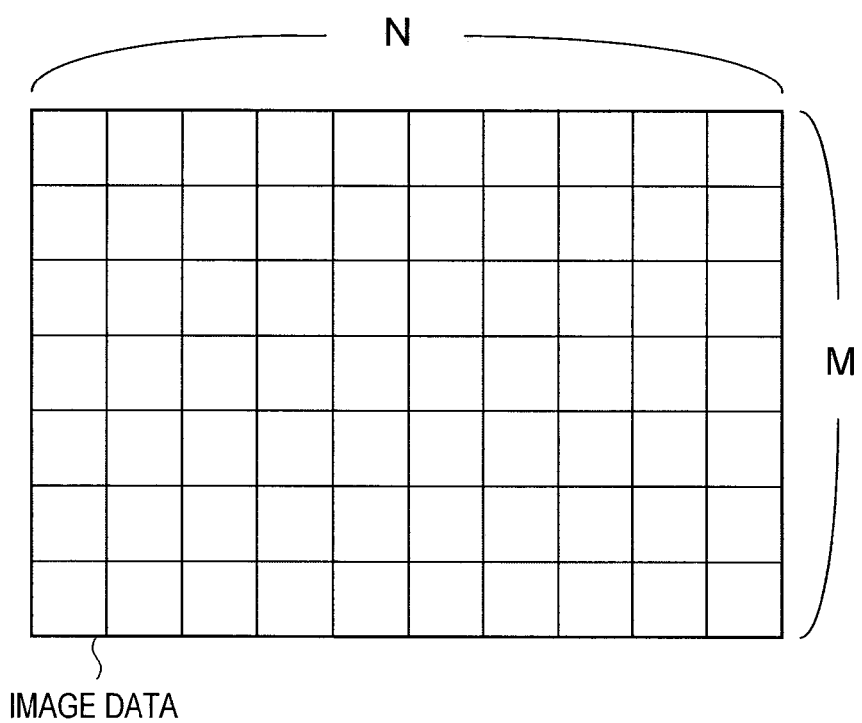
FIG. 10 is a schematic view describing a method of dividing the image into small regions.

As shown in FIG. 10, the reference image (FIG. 9) and the comparative image (FIG. 5B) for calculating the displacement amount from the reference image are divided into a plurality of small regions, that is, divided by N in the horizontal direction and by M in the vertical direction. Correlation values are obtained while moving a small region of the reference image among the small regions of the comparative image, and the motion vector up to the position where the correlation value is the smallest is assumed as the displacement amount of the region. A sum of absolute differences (SAD) or the like is used for the correlation value. The method for calculating the displacement amount is not limited to block matching, and may be other displacement amount detection methods.

Since the defocus amounts of the main objects are equal, a highly accurate displacement amount calculation result is obtained in the small regions where the main object exists. Furthermore, since the calculation of the displacement amount uses the image of the magnification of 1, the displacement amount to be calculated can be calculated with one-pixel accuracy.

Figure 11:
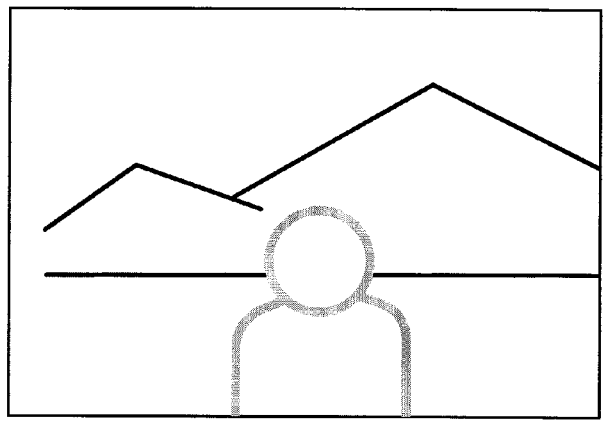
FIG. 11 is a view illustrating an image after alignment by the blurring process of the first embodiment.

In step S3006, the parameter for projection transformation indicating the deformation of the main object is first calculated from the displacement amount in each small region calculated in step S3005 in the displacement correcting unit 1104. The projection transformation is performed on the comparative image (FIG. 5B) using the calculated projection transformation parameter. The resultant image is as shown in FIG. 11, and is aligned so as to achieve a match with the main object in the reference image (FIG. 9). The position of the background other than the main object does not match. The method for correcting displacement is not limited to projection transformation.

In step S3007, the object region is discriminated using two aligned images (FIG. 9 and FIG. 11).

Object Region Discriminating Process

The object region discriminating process of step S3007 of FIG. 3 will now be described with reference to FIG. 4. The process of FIG. 4 is realized by causing the system control unit 1005 to develop a program stored in the ROM in the work area of a volatile memory such as the RAM and execute the same.

Figure 4:
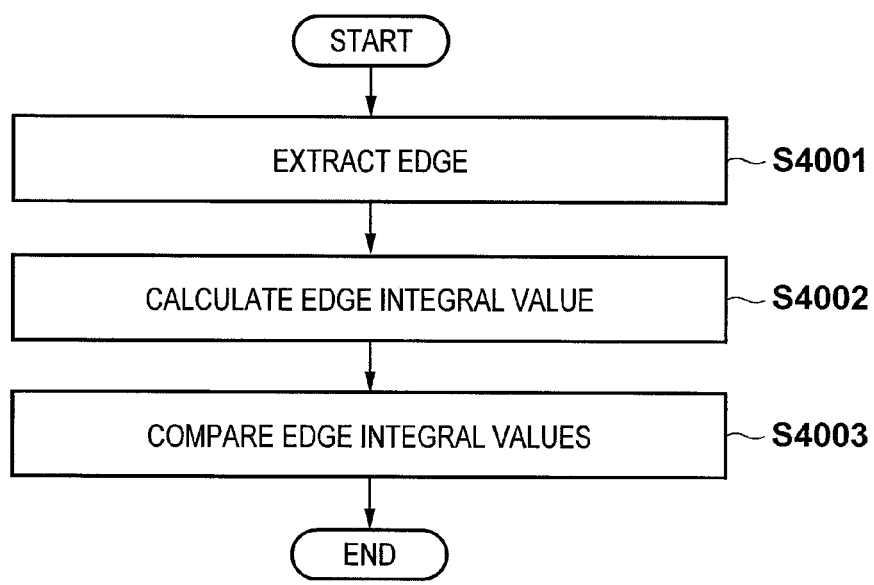
FIG. 4 is a flowchart showing an object region discriminating process of FIG. 3.
Figure 12A:
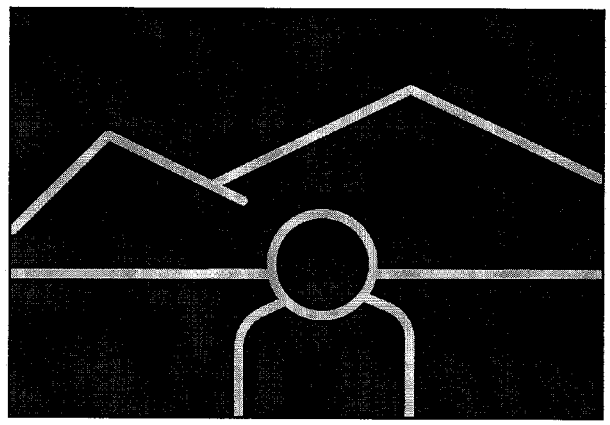
FIGS. 12A and 12B are views illustrating an edge image extracted by the object region discriminating process of the first embodiment.
Figure 12B:
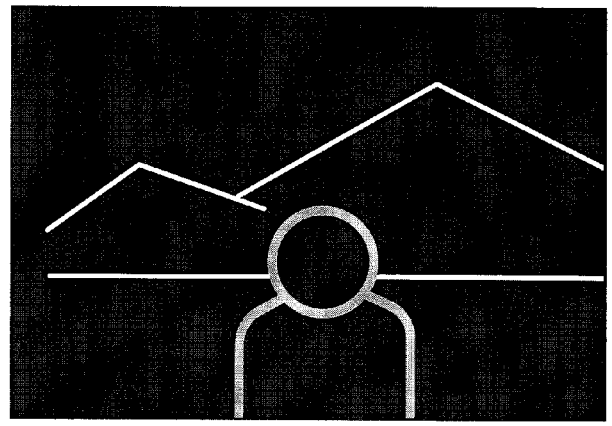

According to FIG. 4, in step S4001, the system control unit 1005 extracts edges in two aligned images in the edge extracting unit 1105. A high-pass filter for allowing signals of only high frequency band to pass is used for the edge extracting method. The result of performing edge extraction on FIG. 9 is shown in FIG. 12A, and the result of performing edge extraction on FIG. 11 is shown in FIG. 12B. The edge extracting method is not limited to the above method, and may be other methods as long as it is a method for accurately extracting edges in the images.

In step S4002, the system control unit 1005 calculates an edge integral value for each image (FIGS. 12A and 12B) in which the edge extraction was performed in the edge integral value calculating unit 1106.

The method for calculating the edge integral value includes dividing the image of FIGS. 12A and 12B into a plurality of small regions, that is, dividing by N in the horizontal direction and by M in the vertical direction, similarly to step S3005. The edge amount is integrated for each small region. To explain the subsequent processes, the small regions in FIG. 12A are referred to as blk_ref[0] to blk_ref[M*N−1] and the small regions in FIG. 12B are referred to as blk_comp[0] to blk_comp[M*N−1].

In step S4003, the system control unit 1005 compares the edge integral values of the small regions calculated in step S4002 in the edge integral value comparing unit 1107.

The method for comparing includes dividing the edge integral values of the small regions blk_ref[0] to blk_ref[M*N−1] in FIG. 12A by the edge integral values of the small regions blk_comp[0] to blkcomp[M*N−1] in FIG. 12B to calculate the edge ratio for each small region. A small region in which the edge ratio is close to one is determined as a region of the main object. Since the edge ratio in a low contrast region is also calculated as a value near one, a small region used in the calculation of the projection transformation parameter indicating the deformation of the main object is referenced in step S3006. If the distance between the small region used in the calculation of the projection transformation parameter and the small region in which the edge ratio is close to one is greater than or equal to a certain amount, that small region is determined to be a low contrast region and not as a region of the main object.

The discrimination of whether or not the small region is a region of the main object is carried out in units of the small regions divided in the process of step S4003. In order to carry out the main object region discrimination in smaller regions, the small region in which the edge ratio is close to one is further divided, and the above process is repeated so that the region of the main object can be discriminated in smaller regions.

Returning to FIG. 3, in step S3008, the system control unit 1005 performs a low-pass filtering process as the blurring process on the region other than the main object discriminated in step S3007 with respect to the image (FIG. 5A) focused on the main object in the blurring unit 1108. The spatial frequency component smaller than or equal to the cutoff frequency in the region other than the region of the main object is thus reduced, and the object image other than the main object can be defocused more than the defocusing of the image captured by the actual driving of the stop and the lens.

According to the configuration and function described above, the correlation calculation is performed between the images in which the frequency bands of the objects are matched when calculating the displacement amount for carrying out alignment between the images having different in-focus positions, so that a highly accurate displacement amount calculation result can be obtained.

Furthermore, since the displacement amount is calculated using the images on which alignment is carried out, there is no error in the displacement amount caused by the temporal difference between the actually captured image and the thin-out image, which is a concern in Japanese Patent Laid-Open No. 2002-112095.

Furthermore, the displacement amount to be calculated can be calculated with one-pixel accuracy since the image of the magnification of 1 is used for the calculation of the displacement amount.

The alignment accuracy can be enhanced by appropriately selecting the filter according to the defocus amount between the images having different in-focus positions.

Second Embodiment

A second embodiment will now be described.

In the second embodiment, the defocus amount of the main object between the images is first calculated, similarly to the first embodiment, to carry out the alignment between the images having different in-focus positions with high accuracy. The inverse of the defocus amount is then set as the magnification, and an image resizing process is carried out according to the set magnification. The resizing process herein is a reduction process. After the resizing process, the displacement amount for carrying out alignment between the images is calculated.

According to such process, not only can the alignment between the images having different in-focus positions be carried out with high accuracy, but also the displacement amount is calculated using the reduced image, and thus the calculation amount can be reduced and the speed of the process can be increased.

The apparatus configuration of the second embodiment is similar to FIG. 1 of the first embodiment and thus the description will be omitted, but there is a difference in the configuration of the image processor 1100.

Configuration of Image Processor

Figure 13:
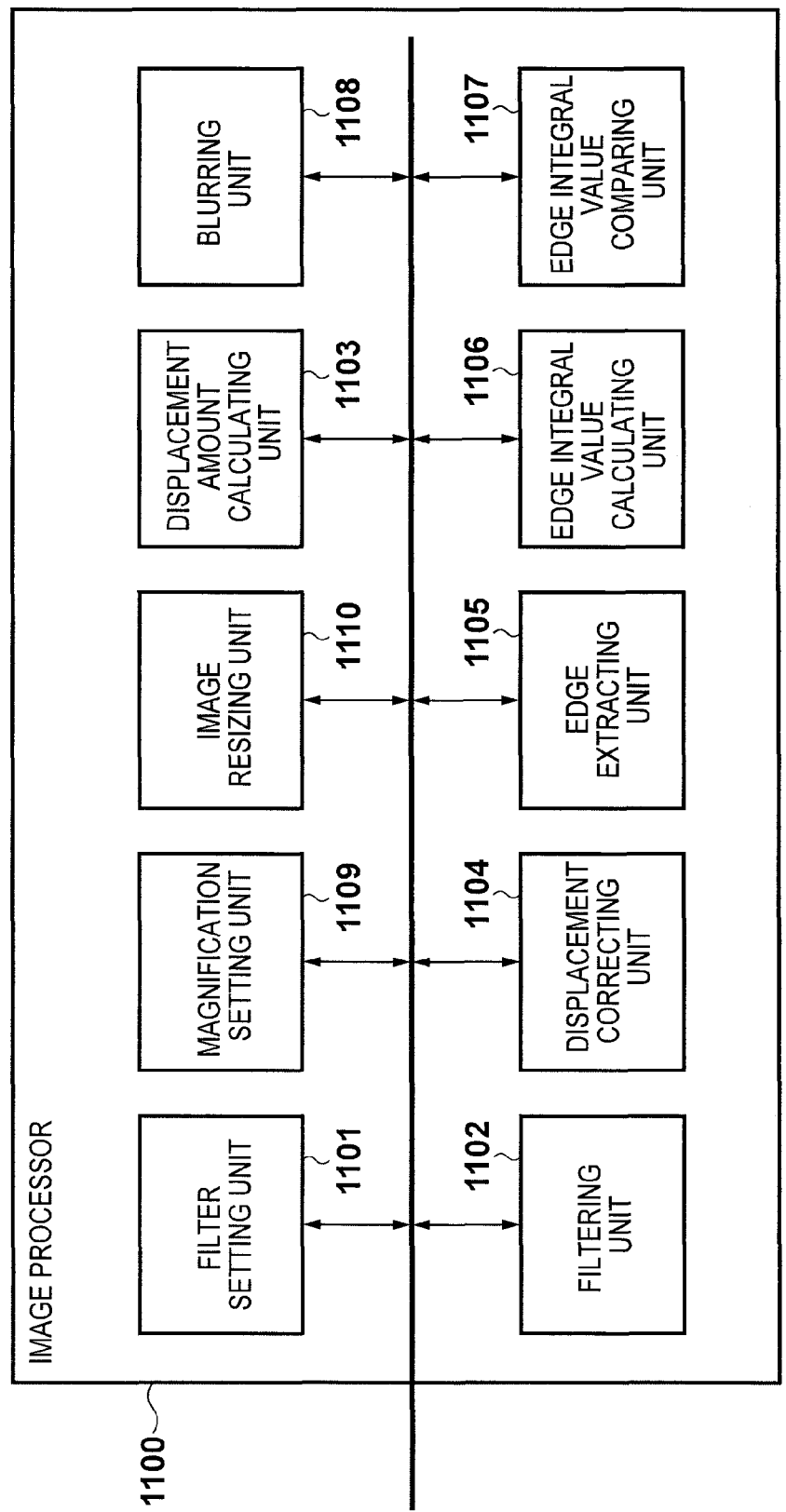
FIG. 13 is a block diagram illustrating a configuration of an image processor of a second embodiment.

The configuration and function of the image processor 1100 of the second embodiment will be described below with reference to FIG. 13 and FIG. 14. The same reference numerals denote the blocks that carry out the same processes as in the first embodiment. The configuration of the second embodiment differs from the configuration of the first embodiment in that a magnification setting unit 1109 and an image resizing unit 1110 are added.

Blurring Process

The blurring process performed by the image processor 1100 of the second embodiment will be described below with reference to FIG. 14. The process of FIG. 14 is realized by causing the system control unit 1005 to develop a program stored in the ROM in the work area of a volatile memory such as the RAM and execute the same.

In FIG. 14, steps S1401 and S1402 are the same as steps S3001 and S3002 of the first embodiment. The image focused on the main object is assumed as the reference image, and the image focused on the background is assumed as the comparative image.

In step S1403, the system control unit 1005 calculates the defocus amount of the main object between the images having different in-focus positions using the lens driving amount $\Delta x$ obtained in step S1402 in the magnification setting unit 1109. The method for calculating the defocus amount is the same as the first embodiment, and hence the description will be omitted. The inverse of the defocus amount is then set as the magnification according to the calculated defocus amount of the main object. Specifically, if x pixels represent the main object before driving the lens and the defocus amount is $\Delta y$, $x\Delta y$ pixels represent the main object after driving the lens. In this case, the magnification to set is $1/\Delta y$.

In step S1404, the system control unit 1005 resizes the two images captured in step S1401 according to the magnification set in step S1403 in the image resizing unit 1110. In the present embodiment, $\Delta y > 0$ is assumed, and the resizing is a reduction process. When the reduction process is carried out, image deterioration called aliasing distortion occurs due to the high frequency component. In order to avoid such aliasing distortion, the reduction process is carried out after removing the high frequency component with the low-pass filter. A reduced image in which the defocus amounts of the main objects in the reference image and the comparative image can be assumed as equal is obtained by performing the resizing process.

In step S1405, the system control unit 1005 calculates the displacement amount of the two images so that the positions of the main objects match in the displacement amount calculating unit 1103. The images that serve as the target for displacement amount calculation are the two reduced images after the resizing process obtained in step S1404.

If the displacement amount is calculated in units of one pixel by block matching similarly to the first embodiment, the calculated displacement amount is the displacement amount between the images reduced by the resizing process, and thus the displacement has low accuracy when converted to a magnification of 1. Specifically describing, if the defocus amount $\Delta y$ is 4, the magnification becomes ¼. The displacement amount is calculated using the image reduced to ¼ by the following resizing process. If the displacement amount calculated in the reduced image is (2, 4), the displacement amount in the original image of the magnification of 1 becomes (8, 16). If the displacement amount calculated in the reduced image is (3, 4), that is, if shifted by one pixel from the previously calculated displacement amount, the displacement amount in the original image of the magnification of 1 becomes (12, 16). Therefore, the displacement amount can be detected only in units of four pixels in the original image of the magnification of 1 if the displacement amount is calculated using the image reduced to ¼.

In the present embodiment, the displacement amount is therefore calculated with accuracy in units of sub-pixels. A sub-pixel estimating method in the block matching uses isometric linear fitting or parabola fitting described in Japanese Patent Laid-Open No. 2009-301181, for example. If the displacement amount is calculated with accuracy in units of sub-pixels, when the displacement amount calculated in the reduced image as described above is (2.0, 4.0), the displacement amount in the original image of the magnification of 1 becomes (8.0, 16.0). If the displacement amount calculated in the reduced image is (2.3, 4.0), that is, if shifted by 0.3 pixels from the previously calculated displacement amount, the displacement amount in the original image of the magnification of 1 becomes (9.2, 16.0). The numbers are rounded off to the nearest whole number to be approximated to (9, 16) in units of one pixel. The displacement amount thus can be detected in units of one pixel in the original image of the magnification of 1.

In step S1406, the system control unit 1005 multiplies the inverse of the magnification set in step S1403 by the displacement amount in the regions calculated in step S1405 to convert to the displacement amount in the original image of the magnification of 1 in the displacement correcting unit 1104. The projection transformation parameter indicating the deformation of the main object is then calculated based on the converted displacement amount. The projection transformation is then performed on the comparative image based on the calculated projection transformation parameter. As a result of performing the projection transformation, the two images are aligned so that the positions of the main object in the reference image and the main object in the comparative image coincide.

In steps S1407 and S1408, the system control unit 1005 sets the filter in which the defocus amounts of the main object in the reference image and the main object in the comparative image become equal, similarly to steps S3003 and S3004 of FIG. 3 in the filter setting unit 1101. As a result of performing filtering on the reference image in the filtering unit 1102, the defocus amount of the main object in the reference image becomes equal to the defocus amount of the main object in the comparative image.

The following steps S1409 and S1410 are the same as steps S3007 and S3008 of FIG. 3.

According to the configuration and function described above, not only can the alignment between the images having different in-focus positions be carried out with high accuracy, but also the displacement amount is calculated using the reduced image, and thus the calculation amount can be reduced and the speed of the process can be increased.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-039131, filed Feb. 24, 2012, which is hereby incorporated by reference herein in its entirety.

What is claimed is:

1. An image processing apparatus comprising:
an image capturing unit configured to capture a plurality of images having different in-focus positions;
a defocus amount calculating unit configured to calculate a defocus amount of an object image in a second image among the plurality of images relative to the object image in a first image among the plurality of images;
a filtering unit configured to perform filtering on the first image according to the defocus amount calculated by the defocus amount calculating unit, wherein the filtering unit makes equal the defocus amounts of the object image in the second image and the object image in the first image; and
a displacement amount detecting unit configured to detect a displacement amount between the second image and the first image on which filtering was performed by the filtering unit.

2. The apparatus according to claim 1, wherein
the image capturing unit includes a lens driving unit configured to drive a lens to change the in-focus position, and
the first image focused on an object and the second image focused on a position different from the first image are captured.

3. The apparatus according to claim 2, wherein the image capturing unit drives the lens within a range in which the displacement amount detecting unit can perform detection to capture the image.

4. The apparatus according to claim 2, wherein the defocus amount calculating unit calculates the defocus amount using driving information of the lens driving unit.

5. The apparatus according to claim 1, further comprising a displacement correcting unit configured to correct displacement between the first image and the second image using the displacement amount detected by the displacement amount detecting unit.

6. An image processing apparatus comprising:
an image capturing unit configured to capture a plurality of images having different in-focus positions;
a defocus amount calculating unit configured to calculate a defocus amount of an object image in a second image among the plurality of images relative to the object image in a first image among the plurality of images;
a magnification setting unit configured to set a magnification of the first and second images based on an inverse of the defocus amount calculated by the defocus amount calculating unit;
a resizing unit configured to change a sizes of the first image and the second image based on the magnification set by the magnification setting unit; and
a displacement amount detecting unit configured to detect a displacement amount between the first and second images whose size was changed by the resizing unit.

7. The apparatus according to claim 6, wherein
the image capturing unit includes a lens driving unit configured to drive a lens to change the in-focus position, and
the first image focused on an object and the second image focused on a position different from the first image are captured.

8. The apparatus according to claim 7, wherein the image capturing unit drives the lens within a range in which the displacement amount detecting unit can perform detection to capture the image.

9. The apparatus according to claim 7, wherein the defocus amount calculating unit calculates the defocus amount using driving information of the lens driving unit.

10. The apparatus according to claim 6, wherein the displacement amount detecting unit detects the displacement amount with an accuracy in units of sub-pixels.

11. The apparatus according to claim 6, further comprising a displacement correcting unit configured to correct displacement between the first image and the second image using the displacement amount detected by the displacement amount detecting unit.

12. An image processing method for performing image processing on a predetermined region using a plurality of images having different in-focus positions, the method comprising the steps of:
calculating a defocus amount of an object image in a second image among the plurality of images relative to the object image in a first image among the plurality of images;
performing filtering on the first image are made equal according to the defocus amount calculated by the defocus amount calculating step, wherein the defocus amounts of the object image in the second image and the object image in the first image; and
detecting a displacement amount between the second image and the first image on which filtering was performed in the filtering step.

13. An image processing method for performing image processing on a predetermined region using a plurality of images having different in-focus positions, the method comprising the steps of:
calculating a defocus amount of an object image in a second image among the plurality of setting a magnification of the first and second images based on an inverse of the defocus amount calculated by the defocus amount calculating unit;
images relative to the object image in a first image among the plurality of images;
changing sizes of the first and second images based on the magnification set in the setting step; and
detecting a displacement amount between the first and second images whose size was changed in step of changing the size of the images.

14. A non-transitory computer-readable storage medium storing a program for causing a computer to execute the method according to claim 12.

15. A non-transitory computer-readable storage medium storing a program for causing a computer to execute the method according to claim 13.

16. An image processing apparatus comprising:
an image capturing unit configured to capture a plurality of images having different in-focus positions;
a defocus amount calculating unit configured to calculate a defocus amount of an object image in a second image among the plurality of images relative to the object image in a first image among the plurality of images;
a filtering unit configured to perform filtering on the image according to the defocus amount calculated by the defocus amount calculating unit, wherein the filtering unit makes equal the defocus amounts of the object image in the second image and the object image in the first image;
a resizing unit configured to change sizes of the first and second images based on a magnification setting unit configured to set a magnification of the first and second images based on an inverse of the defocus amount calculated by the defocus amount calculating unit;
the magnification set by the magnification setting unit; and
a displacement amount detecting unit configured to detect a displacement amount between the second image and the first image whose size was changed by the resizing unit.

17. An image processing method for performing image processing on a predetermined region using a plurality of images having different in-focus positions, the method comprising the steps of:
calculating a defocus amount of an object image in a second image among the plurality of images relative to the object image in a first image among the plurality of images;
performing filtering on the image according to the defocus amount calculated by the step of calculating the defocus amount, wherein the defocus amounts of the object image in the second image and the object image in the first image first image;
setting a magnification of the first and second images based on an inverse of the defocus amount calculated by the defocus amount calculating unit;
changing sizes of the first and second images based on the magnification set in the setting step; and
detecting a displacement amount between the first and second images whose size was changed in step of changing the size of the images.

18. A non-transitory computer-readable storage medium storing a program for causing a computer to execute the method according to claim 17.

* * * * *